Sept. 14, 1943.  W. C. GRABAU  2,329,195
VOLTAGE AND FREQUENCY REGULATOR
Filed Sept. 13, 1940  3 Sheets-Sheet 1
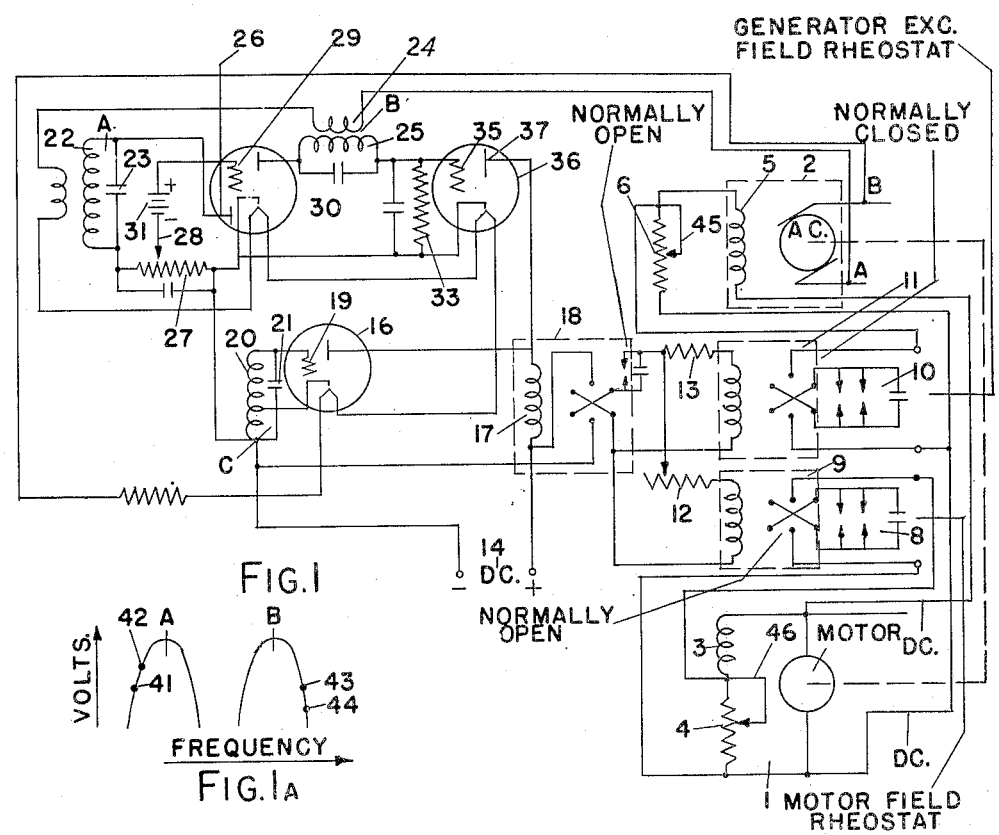
FIG.1
FIG.1A
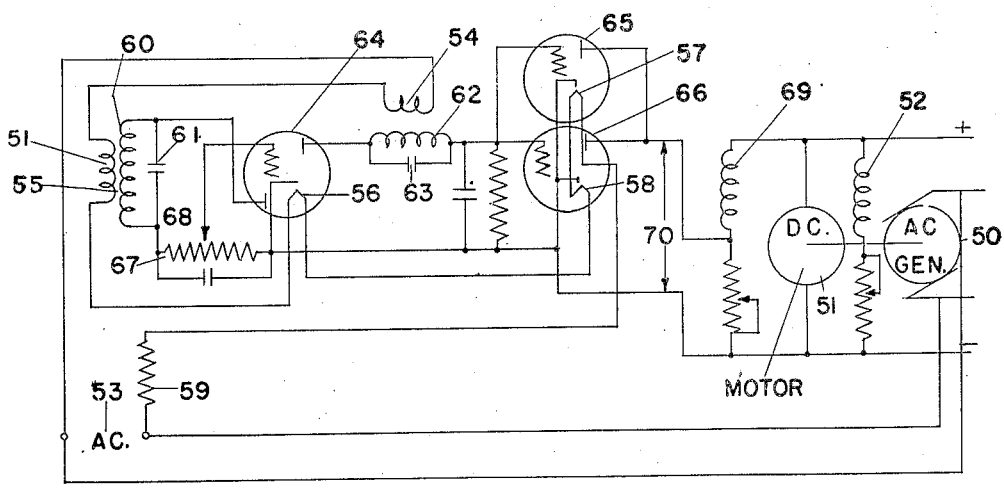
FIG.2
INVENTOR
William Christian Grabau
BY
ATTORNEY Sept. 14, 1943.   W. C. GRABAU   2,329,195
VOLTAGE AND FREQUENCY REGULATOR
Filed Sept. 13, 1940   3 Sheets-Sheet 2

INVENTOR
William Christian Grabau
BY
ATTORNEY

Sept. 14, 1943. W. C. GRABAU 2,329,195
VOLTAGE AND FREQUENCY REGULATOR
Filed Sept. 13, 1940 3 Sheets-Sheet 3

INVENTOR
William Christian Grabau
BY
ATTORNEY

Patented Sept. 14, 1943

2,329,195

UNITED STATES PATENT OFFICE 2,329,195

VOLTAGE AND FREQUENCY REGULATOR

William Christian Grabau, Boston, Mass., assignor to Submarine Signal Company, Boston, Mass., a corporation of Maine Application September 13, 1940, Serial No. 356,710

12 Claims. (Cl. 171—119)

The present invention relates to voltage and frequency control of alternating current machines.

In alternating current systems in order to maintain the constant generated frequency it is necessary to maintain the speed of the alternator or motor generator constant. While the maintaining of the alternator speed constant will produce a constant frequency, nevertheless the generated voltage may vary with the load and this variation in the supply voltage can not, of course, as with a direct current source be kept constant by increasing and decreasing the generator speed since, of course, this would also change the frequency.

In the present system regulation is obtained for the desired frequency as well as the desired voltage. The present control system is applicable for the control of both the voltage and frequency or the control of either voltage and frequency independently of one another. In the present invention the variation in frequency is converted into a voltage variation and applied to a vacuum tube control circuit for increasing or decreasing the motor field current whereby the generator speed and frequency are maintained constant. The system according to the present invention may be applied to all types of motor generators and may be used to control within wide limits both the frequency and voltage of the alternating current source.

Figure 3:
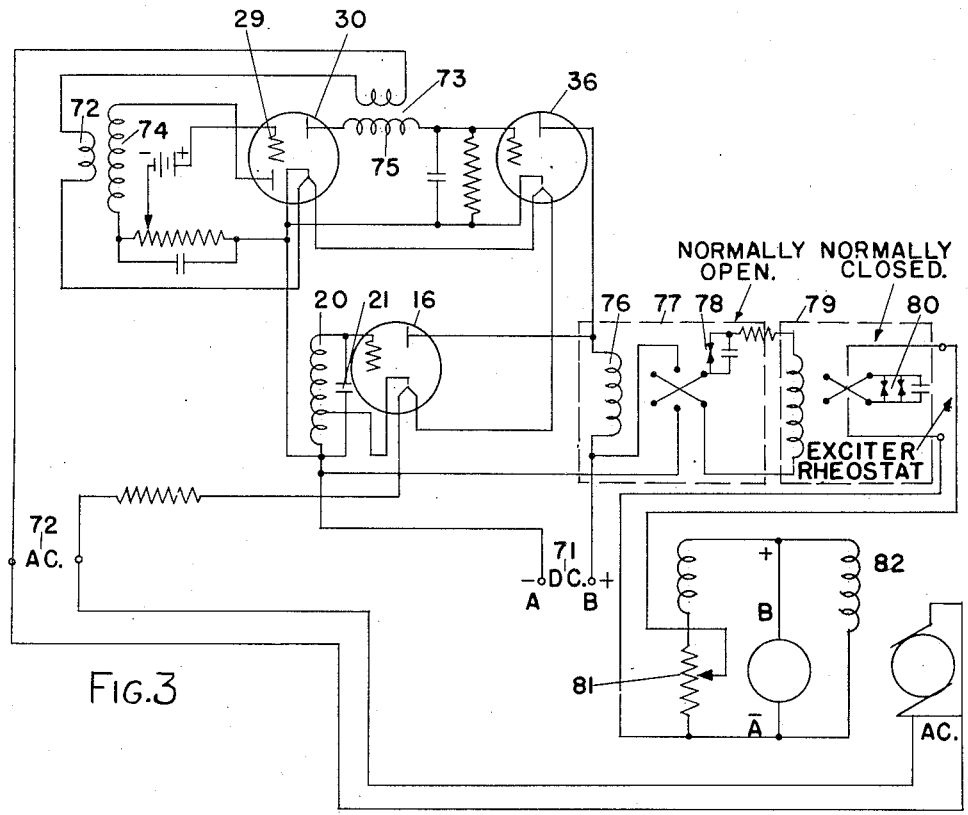
Figure 4:
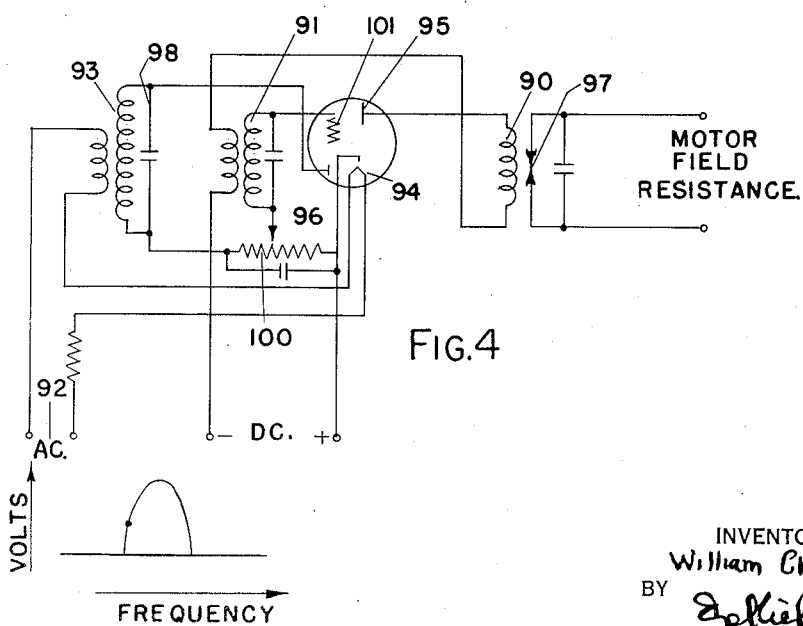
Figure 5:
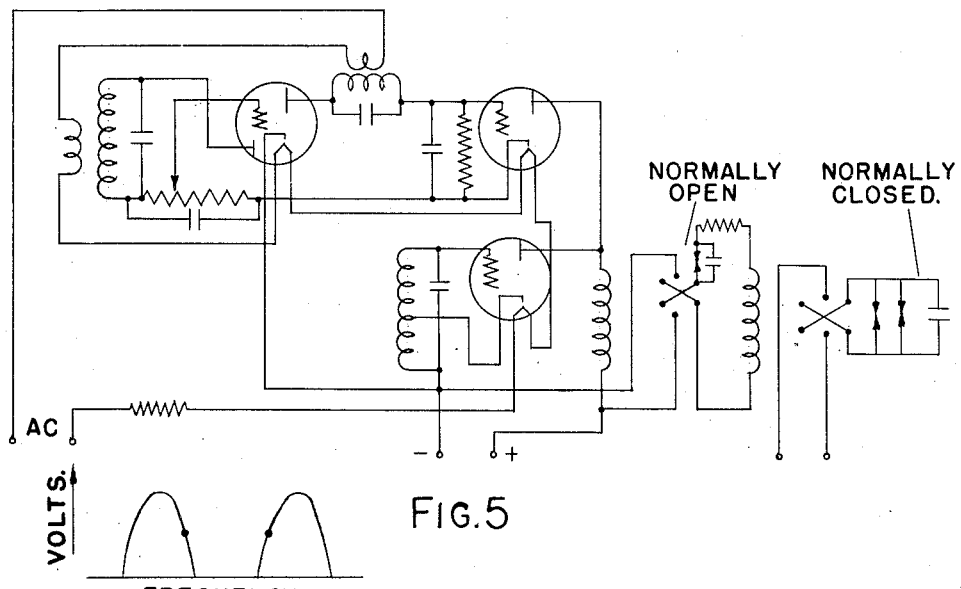
Figure 6:
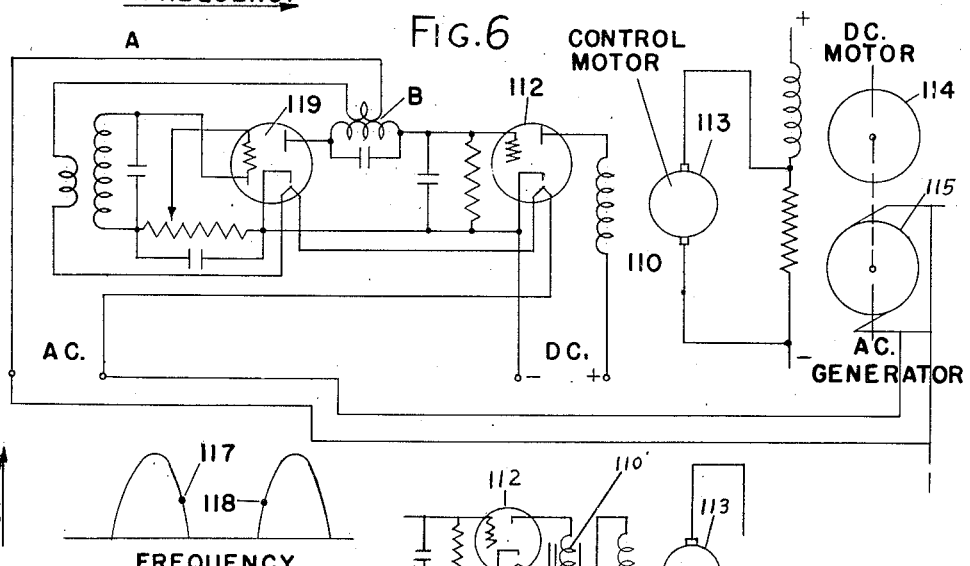
Figures 6A, 6B:
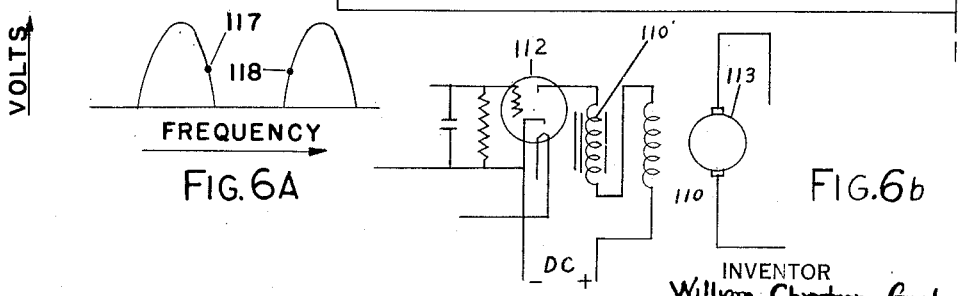

The present invention will be described in the specification below in connection with the drawings illustrating an embodiment of the invention in which Fig. 1 shows a circuit for regulating both the voltage and frequency of a motor generator set; Fig. 1a shows a pair of resonant curves associated with Fig. 1; Fig. 2 shows a circuit similar to that shown in Fig. 1 for controlling the frequency alone; Fig. 3 shows a modification of the system of Figs. 1 and 2 for controlling the voltage alone; Fig. 4 shows a modification of the system shown in Fig. 3 for frequency control; Fig. 5 shows a modification of the system shown in Fig. 1; Fig. 6 shows a modification of the system shown in Fig. 2; Fig. 6a shows a pair of resonant curves associated with Fig. 6; and Fig. 6b shows a modification of a detail of Fig. 6.

In Fig. 1 there is shown a motor generator comprising the driving motor 1 and the generator 2. As shown, the motor is a direct current machine with a field winding 3 and a field rheostat 4. The generator field 5, as indicated in Fig. 1, is supplied from the direct current line through the generator field rheostat 6 which is in series with the generator field across the direct current line. In the regulation of both voltage and frequency in this system it should be noted that normally when the motor field rheostat is cut out of the system by the closing of contacts 8 of the relay 9, the field of which will build up, thus permitting the motor to slow down and therefore lowering the frequency. When, on the other hand, the motor field decreases, the motor will speed up and increase the frequency. Shunt operated motors, it will be observed, operate in this way.

With regard to the control of the alternating voltage in the system it will be observed that when the field rheostat 6 is shorted out of circuit by closing the contacts 10 of the relay 11, the current through the generator field 5 will rise and consequently the voltage delivered across the alternating current terminals will increase. On the other hand, when the contacts 10 of the relay 11 are open, the field 5 decreases in strength and the terminal alternating current voltage will therefore also decrease. Thus, it will be observed that closing of the contact 8 of the relay 9 will lower the motor speed and the frequency while closing of the contacts 10 of the relay 11 will raise the generator voltage.

In the arrangement of Fig. 1 it should be noted that normally the contacts of the relay 18 are open while in the normal condition of the relay 11 the contacts 10 are closed and the contacts 8 of the relay 9 are normally open. When the voltage and frequency drop, the operation of the control circuit is such as to maintain the contacts of the relay 18 open, the contacts of the relay 11 closed and the contacts of the relay 9 open. Under these conditions the shorting, therefore, of the rheostat 6 permits a rise in the field current of the field 5 and an increase, therefore, in the alternating current. At the same time since the motor field rheostat 4 is in circuit, the field in the winding 3 decreases, speeding up the motor whereby both voltage and speed are increased.

The control circuit for operating the relays 9 and 11 is supplied with a direct current potential 14 which may be the same potential as the direct current line which supplies the driving motor. The alternating current potential supplied to the control system is, of course, the alternating current potential delivered by the generator 2. Direct current supply is applied to the plate circuit of the vacuum tube 16 through the coil 17 of the control relay 18. The grid 19 of the vacuum tube 16 is also supplied with grid bias through the parallel inductance and capacity circuit having the inductance 20 and the capacity 21. The inductance 20 and capacity 21 form a tuned grid circuit producing in the plate circuit of the tube 16 current pulsations which are adjusted for frequency by the tuned circuit C comprising the inductance 20 and the capacity 21 to a frequency of about ten vibrations per second. The operation of this circuit involving the tuned grid circuit C and the tube 16 is so constructed and adjusted to produce a balance for the operation of the relay 18 so that at no load the relay 18 will be operating intermittently at the frequency mentioned.

The alternating current voltage is applied to the control circuit through two resonant circuit elements. In the one case the step-up transformer 22 the primary of which is in the series circuit across the alternating current line has its secondary tuned by means of the condenser 23 forming a resonant circuit A, while in the other case the transformer 24 in the same series circuit as the transformer 22 has its secondary tuned by the condenser 25 forming the resonant circuit B. These two resonant circuits, it will be noticed from the description below, act in the opposite direction, that is the resonant circuit A produces an increased potential with an increase in frequency, while the resonant circuit B provides a decrease in potential with an increase in frequency. The purpose of this will also be explained later.

The potential developed by the tuned resonant circuit A is rectified through the rectifier 26 and this rectified potential, supplied across the potentiometer 27, in this rectifier circuit is partly applied by means of the adjustable tap 28 to the grid 29 of the vacuum tube 30. A battery 31 is preferably connected in series with the grid. This battery 31, which is connected in circuit in such a way as to place a positive bias on the grid with respect to the cathode, permits the tap 28 to be placed normally half way across the potentiometer 27 and thereby make full use of the respective change in potential developed through the rectifier in the tuned alternating current circuit A. The potential generated in tuned circuit B is likewise applied after rectification through tubes 30 and 36 to the resistance 33 between the grid and cathode of tube 36. The plate circuit of the tube 36 including the plate 37 is connected to the positive side of the direct current potential 14 through the coil 17 of the relay 18.

In the circuit arrangement just described an increase in the negative bias 29 will cause a decrease of plate current in this tube. At the same time with the increase of the bias on the tube 29 the voltage across the tuned circuit B still further drops the negative bias applied to the grid 35 of the tube 36. This brings about the desired increase in current flow in the relay coil 17 and therefore the closing of the contacts of relay 18 which brings about an opening of the contacts 10 for a decrease in voltage and a closing of contacts 8 for a decrease in speed and frequency.

The voltage rise just assumed in the consideration of the operation of the circuit is occasioned as illustrated by the Fig. 1a by the increase in frequency which would bring the normal operating point 41 for normal frequency condition to a point higher on the resonance curve A' as, for instance, point 42, thus causing an increase in voltage amplitude in the resonant circuit A. This same increase in frequency, however, acting on the resonant circuit B' will bring the point of operation from the initial point 43 because of an increase in frequency to the point 44, thus producing the decrease in potential previously mentioned in connection with the tuned circuit B. This rise in frequency which operates to close the contacts of the relay 18 will decrease the delivered alternating current potential and at the same time decrease the motor speed to lower both the frequency and voltage to normal conditions.

Both the generator field and the motor field are provided with rheostat controls 45 and 46, respectively, so that corresponding adjustments can be made for the operation of the relays 9 and 11 to maintain the desired condition. Adjustments of these rheostats and of the potentiometer 12 together with the position of the potentiometer tap 28 in the vacuum tube control circuit permits the making of initial circuit adjustments so that the system in operation will keep the necessary constancy of voltage and frequency.

If the frequency in the system should drop, the first grid 29 becomes less negative with the resultant increase in plate current in the tube 30 and a corresponding increase in the negative bias on the tube 36, thus tending to decrease the plate current flow through the coil 17 and permit the opening of the relay 18. The result of this has been shown above to increase both frequency and voltage.

It will be observed, of course, that an increase in alternating current potential can occur without frequency change, as, for instance, in a motor generator in which the motor armature is made comparatively very heavy and give a comparatively high moment of inertia. In such a case even with a considerable variation in load and voltage change, the machine speed may comparatively change slightly. Under such conditions the operation of the circuit may be made to produce a comparatively large change in alternating current field excitation with only a small change in the motor field excitation and therefore motor speed. These elements can, of course, be regulated by the regulation of the field rheostats 45 and 46.

In Fig. 2 there is shown a modification of the circuit illustrated in Fig. 1 for controlling the frequency of an alternating current supply source. The circuit of this modification may be used for most any type of regulation and has in particular been used for the supply of an alternating current in a gyro control. In Fig. 2 the alternating current generator 50 is driven by the direct current motor 51 the power for which is supplied across the direct current lines marked + and —. In this arrangement the field for the direct current source is connected directly across the direct current line so that with a steady direct current supply source the fields 52 and 69 will remain constant providing the voltage regulator circuit offers a constant impedance across the terminals 70 to the direct current field rheostat. In this case the regulator terminals marked AC and numbered 53 are assumed to be connected across the alternating current generator 50. The terminals 53 are the ends of a series circuit including the transformers 54 and 55 and the heaters 56, 57 and 58 as well as a resistance 59 which are all connected in series across the terminals 53.

As in Fig. 1, the secondary 60 of the transformer 55 and the condenser 61 form a resonant circuit which corresponds to the circuit A in Fig. 1. Likewise the secondary 62 of the transformer 54 and the condenser 63 form the same type of resonant circuit as the circuit B of Fig. 1. In other respects the circuit embracing the tubes 64, 65 and 66 are similar to the circuit embracing the tubes 30 and 36 of Fig. 1 with the exception that in Fig. 2 the two tubes 65 and 66 are connected together in parallel and therefore present a greater current capacity than the tube 36 of Fig. 1 alone. The resonant circuit formed by the inductance 60 and capacity 61 corresponds likewise to the curve A' of Fig. 1a while the resonant circuit formed by the inductance 62 and capacity 63 corresponds to the resonant curve B' of Fig. 1a.

The potential generated across the resonant circuit formed by the elements 60 and 61 is applied through the diode rectifier element of the tube 64 corresponding to the element 26 of Fig. 1 to the potentiometer 67 and the control for any desired frequency is obtained by properly setting the pointer 68 corresponding to 28 of Fig. 1. The resonant circuit comprising the elements 62 and 63 has its electrical vibrations rectified through the plate-cathode circuit of the tube 64, thereby providing rectified direct current impulses to the grids of the tubes 65 and 66. In the operation of the system, therefore, as the frequency increases, the output voltage of the resonant circuit formed by the elements 60 and 61 increases which makes the grid of the tube 64 become more negative. This decreases the current in the plate circuit of the tube while at the same time the voltage delivered by the resonant circuit 62 and 63 also decreases, thus making the grids of the tubes 65 and 66 less negative, causing sufficient plate current to flow through the plate circuit to increase the field 69 of the direct current motor. This increase in the field 69 will bring about a corresponding decrease in speed of the motor 51 under constant voltage conditions and thereby decrease the alternating current rotor speed and the frequency of the source 50. It will be noted in Fig. 2 that the relay shown in Fig. 1 is omitted. If a greater variation in current is necessary than that provided for by the variation in impedance in the tube circuits, a relay or a control relay with a power relay operated thereby may be used.

The arrangement of Fig. 3 is quite similar to the arrangement shown in Fig. 1. In this case, however, it is applied only to voltage regulation and therefore there is no resonant frequency circuit as in Figs. 1 and 2. In Fig. 3 the direct current source 71 corresponds to the source 14 of Fig. 1 and similarly the same elements are used in the circuit of Fig. 3 including the inductance 20, capacity 21, the tube 16, the relay 18 with the relay coil 17. The alternating current source 72 to be regulated corresponds also to the alternating current source 15. The transformers 72 and 73, however, do not have their secondaries 74 and 75, respectively, in tuned circuits so that the increase in voltage supplied by the secondaries 74 and 75 is derived only from the increase in potential across the alternating current source 72 and likewise the decrease across the alternating current source 72 produces a decrease in voltage supplied by the secondaries 74 and 75. In other respects the circuit of Fig. 3 is like that of Fig. 1. A diode-triode tube 30 in Fig. 3 corresponds to the same numbered element in Fig. 1 and likewise the tube 36 in Fig. 3 corresponds to the same numbered element in Fig. 1. A decrease in negative bias on the grid 29 of the tube 30 will cause more plate current to flow through the tube and increase in negative bias on the second tube 36. This will decrease the plate current through the coil 76 of the relay 77 and open the contacts 78 which normally are opened. The second relay 79, on the other hand, will operate under these circumstances to close the contacts 80 which normally are closed, shortcircuiting the exciter rheostat 81 of the direct current exciter. The voltage of the exciter will thereupon rise and thereby the voltage of the alternating current source through the increase of current in the exciter field 82.

Increase in voltage across the alternating current supply 72 will cause a reverse action and open the relay across the exciter field, thus decreasing the current in the exciter field and decreasing thereby in the same manner as described an alternating current voltage.

In the arrangement shown in Fig. 4 the circuit is quite similar to that shown in Fig. 1 except that the frequency alone is to be regulated. In this case the relay 90 is operated by pulsating vibrations supplied through the tuned circuit 91 corresponding to the circuit of elements 20 and 21 of Fig. 3. The alternating current from which the frequency is to be regulated is supplied from the alternating current source 92 by means of a series circuit embracing the transformer 93 and cathode heater 94 of the diode-triode tube 95. No-load regulation is obtained by adjustment of the potentiometer arm 96 for the condition which will bring about the operation of the relay 90 and the closing of contacts 97 an average portion of the time. The tuned circuit 98 corresponding to the tuned circuit A of Fig. 1 is normally operated in the same manner as indicated by the curve A' of Fig. 1a. If the frequency increases, the voltage supplied across the potentiometer resistance 100 will place a greater negative bias on the grid 101 of tube 95, causing less plate current to flow through the tube and tending to keep the relay contacts 97 closed which normally tend to stay closed, causing a decrease in speed to bring the alternating current frequency back to normal.

The modification shown in Fig. 5 is like that shown in Fig. 1 except that the bucking battery 31 of Fig. 1 is omitted. This circuit arrangement may be used where it is unnecessary to overcome the high voltage ratio of the change in voltage to the normal established voltage. It should also be noted that in Fig. 5 the circuit is shown as applied only to frequency control, the control of the generator field excitation being omitted.

The arrangement shown in Fig. 6 is like that shown in Fig. 2 with the exception that the direct current field 110 is in the plate circuit of the tube 112. An increase in the field 110 will bring about an increase in the counter electromotive force of the control motor 113 and therefore a decrease in current in the field 116 which will cause an increase of speed of the direct current motor 114 and an increase in frequency of the alternating current generator 115. An increase in the field 110 is brought about by a lowering in frequency since, as indicated in the curves of Fig. 6a, as the frequency lowers, the point of operation, 117, has an increased amplitude while that of the point 118 has a decreased amplitude. The amplitude of the point 117 is applied to the circuit A and that of the point 118 to circuit B. This action increases the bias on the tube 119 and decreases it on the tube 112, thus permitting more current to flow in the field 110 and bring about the necessary increase in frequency, as explained above. A frequency increase, on the other hand, will act in the reverse direction in the circuit. Instead of connecting the field 110 directly in the output of the vacuum tube circuit, the field current may be varied by an impedance 110', see Fig. 6b, having a saturable core in the output of the vacuum tube circuit whereby a gradual or continuous change in current occurs rather than a sudden change as with a relay.

Having now described my invention, I claim:

1. In combination with a motor generator set having both motor and generator field windings and field rheostats connected respectively in series with said field windings, means for regulating both the alternating current voltage and frequency delivered from said generator including a vacuum tube circuit operated from a direct current source adapted to produce very low frequency impulses, a relay and means for impressing said impulses upon said relay to maintain said relay in intermittently operating condition, means controlled by said relay for connecting said rheostats in and out of circuit with said field windings at normal no-load frequency and voltage, and a second vacuum tube circuit having means for superimposing a further variation in current on said relay for controlling the operation thereof under varying load conditions including resonant input elements whose power is derived from the alternating current delivered and to be regulated for impressing varying electrical conditions in accordance with said voltage and frequency variations upon said second vacuum tube circuit and means in said second vacuum tube circuit for producing said further variation in current on said relay.

2. In combination with a motor generator set having both motor and generator field windings and field rheostats connected respectively in series with said field windings, means for regulating both the alternating current voltage and frequency delivered from said generator including, in combination, a circuit oscillating at a very low constant frequency, a vacuum tube control circuit having elements at resonance near the frequency to be controlled, means connecting said resonant elements across the alternating current circuit and means including said vacuum tube circuit operative by the variation in frequency impressed therein for varying the output current of said circuit and means associated in the output of said circuit and the output of said oscillatory circuit for controlling the rheostats in the motor and generator field winding circuits for overcoming the variations in frequency and voltage.

3. In a motor generator system, means for regulating both voltage and frequency including a vacuum tube control circuit having a plurality of vacuum tubes with cathode, anode and control electrodes, means coupling the plate circuit of the first tubes to the grid of the second tube and independent resonant circuits associated with the grids of each of said vacuum tubes for varying the bias on said grids thereof in opposite directions for increasing the effect of a frequency variation in said resonant circuit and means operative in the output of said vacuum tube circuit for controlling the current flowing in the field windings of a motor generator system whereby the speed and frequency of the alternating current generated in the system is controlled.

4. In a motor generator system, means for regulating the frequency and voltage of the alternating current system including means for controlling the field winding currents of said motor generator system whereby said regulation is obtained, comprising an oscillatory circuit, a vacuum tube control circuit responsive to variations in voltage and frequency of said system to produce corresponding regulating outputs and means combining the outputs of both circuits for varying the current of said field windings of said motor and generator to control said voltage and frequency, said oscillatory circuit furnishing a definite selected periodic variation upon which the varying output of said vacuum control tube circuit is impressed.

5. In combination with a motor generator set having field winding circuits with means for controlling the field currents flowing therethrough, means for controlling the currents in said windings including, in combination, an independent oscillatory source and a vacuum tube control circuit operatively connected to said alternating current source, said vacuum tube control circuit having a plurality of resonant circuits adapted to cause by reason of variations in frequency variations in outputs in said vacuum tube circuits, means combining the outputs of both said oscillatory source and said vacuum tube control circuit and means operative thereby for controlling the current in said field windings whereby the frequency and voltage of motor generator set is controlled, said oscillatory circuit furnishing a chosen periodic variation upon which the varying output of said vacuum control tube circuit is impressed.

6. In a system for regulating the frequency of an alternating current motor generator having field windings, means for controlling the current flowing through said field winding in the motor of said motor generator system including a vacuum tube circuit having a plurality of vacuum tubes with cathode, anode and grid electrodes, a plurality of cooperating resonant circuits, each one operatively connected respectively for varying the voltage impressed upon the grids of said tubes, said resonant circuits being adjusted in frequency whereby the alternating current frequency to be maintained is on the lower side, in frequency of the resonance curve of the one of said circuits and on the higher side in frequency of the resonance curve of another of said circuits whereby a change in frequency will produce opposite effects in voltage variation in said resonant circuits and means employing said opposite effects in different parts of the same vacuum tube circuit in additive relationship for controlling the frequency of the alternating current source by the control of the field current of said motor.

7. In a system for regulating the frequency of an alternating current motor generator having field windings, means for controlling the current flowing through said field winding in the motor of said motor generator system including a vacuum tube circuit having a plurality of vacuum tubes with cathode, anode and grid electrodes, a plurality of cooperating resonant circuits each one operatively connected respectively for varying the voltage impressed upon the grids of said tubes, said resonant circuits being adjusted in frequency whereby the alternating current frequency to be maintained is on the lower side, in frequency of the resonance curve of one of said circuits and on the higher side in frequency of the resonance curve of another of said circuits whereby a change in frequency will produce opposite effects in voltage variation in said resonant system and means employing said opposite effects in said vacuum tube circuit in additive relationship, means providing an independent source of oscillations and means combining the output of said vacuum tube circuit and the output of said independent source for varying the current in said motor field.

8. In a system for regulating the frequency of a motor generator set, a vacuum tube circuit having input resonant elements connected to the source whose frequency is to be regulated, said resonant elements having frequency characteristics whereby a rise in frequency will bring opposite voltage actions respectively in said resonant elements and means employing said opposite voltage actions respectively in said resonant elements to produce additive effects in said circuit, a control-motor having a field winding, means connecting the output of said vacuum tube circuit to the field winding for varying the speed of said control motor and means operative thereby for controlling the frequency of the current delivered by said motor generator set.

9. In a system for regulating the frequency of a motor generator set, a vacuum tube circuit having input resonant elements connected to the source whose frequency is to be regulated, said resonant elements having frequency characteristics whereby a rise in frequency will bring opposite voltage actions respectively in said resonant elements, means for rectifying the voltages derived from said resonant elements and means employing said opposite voltage actions respectively in said resonant elements to produce additive effects in said circuit and means operative in the output of said vacuum tube circuit in response to the variations in said voltages for regulating the frequency of said motor generator set.

10. In a system for regulating the frequency of a motor generator set, a vacuum tube circuit having input resonant elements connected to the source whose frequency is to be regulated, said resonant elements having frequency characteristics whereby a rise in frequency will bring opposite voltage actions in said resonant elements, means for rectifying the voltages derived from said resonant elements and means employing said opposite voltage actions respectively in said resonant elements to produce additive effects in said circuit, said motor generator set having field windings and means operative in the output of said vacuum tube circuit in response to the variations in said voltages for controlling the current in said field windings for regulating the frequency of said motor generator set.

11. In a system for regulating the frequency of a motor generator set, a vacuum tube circuit having input resonant elements connected to the source whose frequency is to be regulated, said resonant elements having frequency characteristics whereby a rise in frequency will bring opposite voltage actions in said resonant elements and means employing said opposite voltage actions in said resonant elements to produce additive effects in said circuit, said motor generator set having field windings and a plurality of interlocking relays operative successively one from the other, the first having its relay coil in the output of said vacuum tube circuit and the last relay having electrical elements in circuit controlling the current in said field windings for regulating the frequency of said motor generator set.

12. In a system for regulating the frequency of a motor generator set, a vacuum tube circuit having input resonant elements connected to the source whose frequency is to be regulated, said resonant elements having frequency characteristics whereby a rise in frequency will bring opposite voltage actions in said resonant elements and means employing said opposite voltage actions in said resonant elements to produce additive effects in said circuit, said motor generator set having field windings and means connected in the output of said vacuum tube circuit for continually varying the current in said field windings, said means comprising a saturable core in the output circuit of said vacuum tube.

WILLIAM CHRISTIAN GRABAU.